United States Patent
Anzai et al.

(10) Patent No.: US 6,769,694 B2
(45) Date of Patent: Aug. 3, 2004

(54) MAGNETIC FLUID SEAL DEVICE

(75) Inventors: Hiroshi Anzai, Nihonmatsu (JP); Hirokazu Yamamoto, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/398,210

(22) PCT Filed: Oct. 9, 2001

(86) PCT No.: PCT/JP01/08859

§ 371 (c)(1),
(2), (4) Date: Apr. 8, 2003

(87) PCT Pub. No.: WO02/31385

PCT Pub. Date: Apr. 18, 2002

(65) Prior Publication Data

US 2004/0012150 A1 Jan. 22, 2004

(30) Foreign Application Priority Data

Oct. 12, 2000 (JP) ......................... 2000-312622

(51) Int. Cl.$^7$ ............................................. F16J 15/43
(52) U.S. Cl. ........................................................ 277/410
(58) Field of Search .................................. 277/410, 501

(56) References Cited

U.S. PATENT DOCUMENTS

| | | | | | |
|---|---|---|---|---|---|
| 4,309,040 A | * | 1/1982 | Pierrat | ........................ | 277/351 |
| 4,502,700 A | * | 3/1985 | Gowda et al. | ............... | 277/410 |
| 4,527,805 A | * | 7/1985 | Gowda et al. | ............... | 277/410 |
| 5,118,118 A | * | 6/1992 | Tadic et al. | ................. | 277/351 |
| 5,165,701 A | * | 11/1992 | Koba | ......................... | 277/410 |
| 5,704,613 A | * | 1/1998 | Holtkamp | .................... | 277/302 |
| 6,290,233 B1 | * | 9/2001 | Yamamura et al. | ......... | 277/410 |
| 6,305,694 B1 | * | 10/2001 | Yamazumi et al. | ......... | 277/410 |

FOREIGN PATENT DOCUMENTS

| | | | |
|---|---|---|---|
| JP | 61-58770 | | 4/1986 |
| JP | 2-85074 | | 7/1990 |
| JP | 3-213641 | | 9/1991 |
| JP | 7-77282 | | 3/1995 |
| JP | 7-174240 | * | 7/1995 |
| JP | 2000-110948 | | 4/2000 |
| WO | WO00/73837 | | 12/2000 |

* cited by examiner

*Primary Examiner*—Alison K. Pickard
(74) *Attorney, Agent, or Firm*—Jacobson Holman PLLC (57) ABSTRACT

In a housed state, a magnetic fluid 4 is positioned in a groove 11 and spaced from the outer circumference of a lens barrel 10, so that a fluorochemical surface modification film of the outer circumference of the lens barrel 10 can be prevented from deteriorating at a position to confront the magnetic fluid 4 in the housed state. Therefore, the deterioration of the fluorochemical surface modification film of the outer circumference of the lens barrel 10 does not proceed earlier at a local region, so that the premature wetting of the outer circumference of the lens barrel 10 with the magnetic fluid 4 can be prevented to elongate the lifetime of a light shielding device 1.

13 Claims, 8 Drawing Sheets

MAGNETIC FLUID SEAL DEVICE

This is a nationalization of PCT/JP01/08859, filed Oct. 9, 2001 and published in Japanese.

TECHNICAL FIELD

This invention relates to a magnetic fluid sealing device for sealing the clearance between two members reciprocating relative to each other, with a magnetic fluid, and is applied, for example, to a light shielding device for shielding the light of the zoom lens portion of a camera or a dust sealing device of a precision instrument.

BACKGROUND ART

The magnetic fluid sealing device of this kind is interposed between the relatively reciprocating two members across two regions requiring a sealing property. And, the magnetic fluid sealing device seals the clearance between the two members by causing a magnetic fluid held on one of the two members to contact the surface of the other member (or the sliding contact member).

In this magnetic fluid sealing device, the surface of the sliding contact member to be contacted by the magnetic fluid may be subjected to the "wetting-preventing treatment" for lowering the wettability with the magnetic fluid. In JP-A-2000-110948, for example, the sliding contact member is polished on its surface and is then subjected to a surface treatment for coating the shaft surface with a fluorochemical surface modification agent having an oil-repelling property. By this wetting-preventing treatment, the magnetic fluid is prevented at the time of relative reciprocations from sticking to and residing on the surface of the sliding contact member.

However, the case of the aforementioned related art has the following problems.

Generally, the magnetic fluid sealing device takes a longer time period in a stopped state where the two members stop at a specified position than in a moved state where the two members are relatively reciprocated.

Here, the oil-repelling property of the fluorochemical surface modification film formed on the surface of the other member degrades as the time period for contacting with the magnetic fluid is elongated.

Therefore, the fluorochemical surface modification film at the-portion contacted by the magnetic fluid when the magnetic fluid sealing device is in the stopped state is deteriorated so that the wetting with the magnetic fluid occurs.

When the wetting with the magnetic fluid thus occurs, the magnetic fluid sealing device cannot exhibit the sealing effect so that it terminates its lifetime.

In short, the deterioration of the fluorochemical surface modification film contacted by the magnetic fluid at the stopped time is a factor to determine the lifetime of the magnetic fluid sealing device of the conventional art.

Moreover, the magnetic fluid sealing device has a variety of application ranges and is demanded, depending upon the application range, for having a followability (or a quick response) of the magnetic fluid to the high-speed relative reciprocations of the two members. In the case of a cylinder/piston device, for example, the reciprocating speed demanded is as high as about 10 mm/s to 30 mm/s. As in the related art, however, only the coating film of the fluorochemical surface modification agent cannot achieve a response to such a high reciprocating speed so that the sealing property cannot be retained.

The present invention has been conceived to solve the aforementioned problems of the related art and has an object to provide a magnetic fluid sealing device, which is intended to prevent the deterioration of the surface treatment and to elongate the lifetime. Another object is to provide a magnetic fluid sealing device, which is excellent in the quick response.

DISCLOSURE OF INVENTION

According to the invention, there is provided a magnetic fluid sealing device for sealing the clearance of two members assembled to reciprocate relative to each other, comprising: a magnetic fluid held magnetically on one of the two members and contacting the surface of the other member for sealing the clearance; a groove formed in the surface of the other member for spacing the surface of the other member from the magnetic fluid when the two members are at a specified stop position; and a seal member for sealing the clearance when the two members are at the specified stop position.

In the stopped state of the two members, therefore, the magnetic fluid is positioned in the groove and spaced from the surface of the other member. At the position confronting the magnetic fluid at the stopped time of the two members, therefore, the surface treatment of the other member can be prevented from being deteriorated, but the deterioration of the surface treatment of the surface of the other member does not proceed earlier in a local region so that the lifetime of the device can be elongated.

In the stopped state of the two members, moreover, the seal member seals the clearance between the two members so that the device can keep the satisfactory sealing property.

It is preferable that the edge of the groove for joining the groove and that region of the surface of the other member, which is to be contacted by the magnetic fluid, is chamfered.

As a result, the magnetic fluid can move smoothly from the groove to the region to be contacted by the magnetic fluid, so that the magnetic fluid, which might otherwise be caught by and left on the edge of the groove, can be prevented from being reduced in amount. The magnetic fluid can be held for a long term thereby to elongate the lifetime of the device.

It is preferable that the seal member opens the clearance at the relative reciprocations of the two members.

As a result, at the time of relative reciprocations of the two members, the sliding resistance, as might otherwise be caused by the seal member for sealing the clearance, can be eliminated to lower the driving force necessary for the relative reciprocations of the two members.

It is preferable that the seal member seals the clearance till the magnetic fluid comes into contact with the surface of the other member.

As a result, even when the two members shift from the stopped state to the relatively reciprocating state, the clearance is reliably sealed at all times.

It is preferable that the surface of the other member includes: an outer side region to be contacted by the seal member when the two members take the specified stop position; and an inner side region to be contacted by the magnetic fluid at the time of relative reciprocations of the two members, and that the inner side region is so positioned at a larger distance than the outer side region from the one member that the seal member may be spaced from the surface of the other member at the time of relative reciprocations of the two members.

As a result, at the relatively reciprocating time of the two members, the seal member can open the clearance easily with the driving force applied to the relative reciprocations of the two members.

It is preferable that the surface of the other member is subjected to a wetting-preventing treatment for lowering the wettability with the magnetic fluid.

As a result, the deterioration of the wetting-preventing treatment of the surface of the other member can be prevented at the position confronting the magnetic fluid at the stopped time of the two members, and the deterioration of the wetting-preventing treatment of the surface of the other member does not proceed earlier in a local region, so that the premature wetting of the surface of the other member with the magnetic fluid can be prevented to elongate the lifetime of the device.

It is preferable that the surface of the other member is coated with a surface treating agent having an oil-repelling property.

By thus forming the oil-repelling coating film on the member surface, it is possible to lower the wettability easily with the magnetic fluid.

It is preferable that the surface of the other member is prepared thereon with an organic thin film and is then coated on the organic thin film surface with a surface treating agent having an oil-repelling property.

By thus interposing the organic thin film between the member surface and the oil-repelling coating film (or the coating film of the surface treating agent), the adhesion strength between the member surface and the oil-repelling coating film can be enhanced to prevent the separation or the partial elimination of the oil-repelling coating film thereby to continue the oil-repelling effect (or the wetting-preventing effect) of the member surface for a longer term.

It is preferable that the organic thin film contains polyvinyl alcohol, ethylene-vinyl acetate copolymer, polyvinyl acetate, poly arylamine, polyvinyl ether or ethylene-vinyl alcohol copolymer, or their mixture or copolymer.

As a result, the sufficient adhesion strength between the member surface and the oil-repelling coating film can be acquired to prevent the separation or the partial elimination of the oil-repelling coating film reliably.

It is preferable that the surface treating agent contains a coupling agent containing fluorine, a monomer containing a fluorine chain, or an oil-repelling agent.

As a result, it is possible to form the oil-repelling coating film, which is excellent in a solvent resistance and a thermal stability.

It is preferable that the surface of the other member is subjected to a surface roughness increasing treatment.

As a result, the surface roughness of the oil-repelling coating film formed on the member surface is increased. By increasing the surface roughness of the coating film surface, moreover, the quick response of the magnetic fluid is raised. Even in case the reciprocating speeds of the two members are high, therefore, the stable sealing property can be kept.

It is preferable that the surface treating agent is mixed with fine particles.

The fine particles in the surface treating agent are dispersed to take a two-dimensional array structure. This two-dimensional array structure is retained even after the coating film was formed, so that a coating film having a high surface roughness can be easily prepared. By raising the surface roughness of the coating film surface, the quick response of the magnetic fluid is raised so that the stable sealing property can be kept even in case the reciprocating speed of the two members is high. Moreover, the member surface need not be subjected in advance to the surface roughness increasing treatment. Therefore, it is possible to facilitate the manufacture and to reduce the cost.

It is preferable that the fine particles are fine particles of silica or polytetrafluoroethylene.

The fine particles of these materials have such weak interactions between them that they can easily take the two-dimensional array structure when mixed with the surface treating agent.

BEST MODE FOR CARRYING OUT THE INVENTION

With reference to the drawings, preferred embodiments will be described in detail by way of example. However, the sizes, materials, shapes and relative arrangements of components described in those embodiments should not limit the scope of the invention to them so long as they are not specifically described.

The embodiments are exemplified by using a magnetic fluid sealing device as a light shielding device in the zoom lens portion of a compact camera. Of course, the invention can be suitably applied not only to the light shielding device but also to various devices having two members reciprocating to each other across two regions requiring sealing properties, such as a dust sealing device for a precision instrument.

First Embodiment

Figure 1:
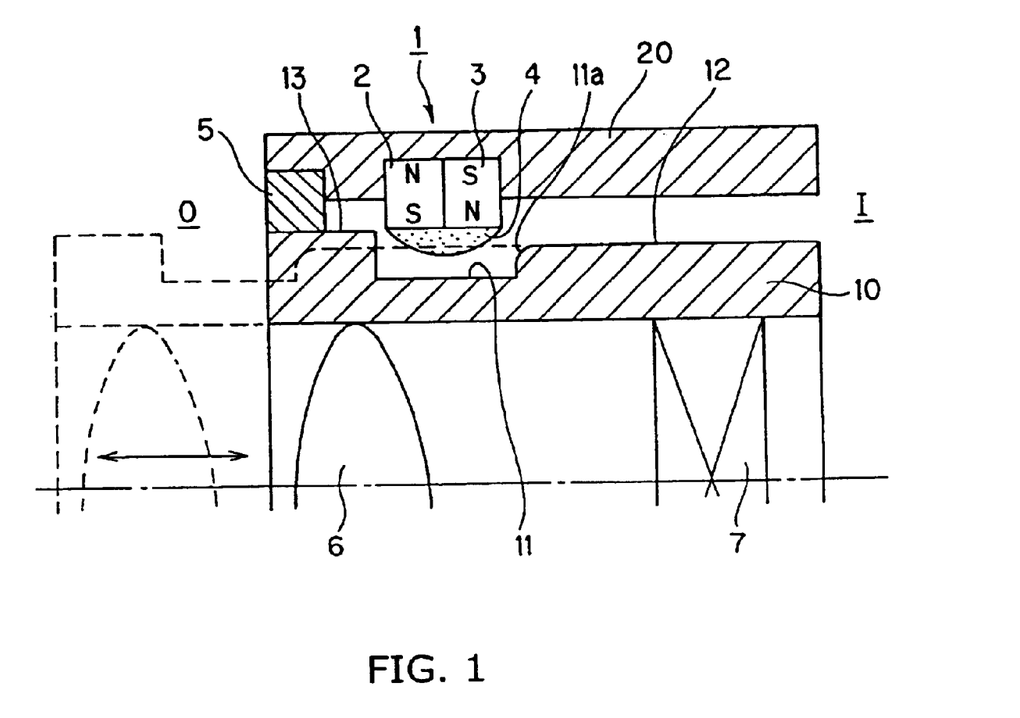
FIG. 1 is a half sectional view showing a light shielding device according to a first embodiment.

With reference to FIG. 1, here will be described the construction, in which a light shielding device according to a first embodiment is used in a compact camera. Here, FIG. 1 shows the zoom lens portion of the compact camera schematically in an enlarged scale.

The zoom lens portion of the compact camera shown in FIG. 1 is provide with an outer lens barrel 20 mounted in the camera body, and a lens barrel 10 mounted in the inner side of the outer lens barrel 20 and capable of reciprocating to protrude from the camera body. The dual lens barrels 10 and 20 are the two members, which are assembled together to reciprocate relative to each other. Moreover, the zoom lens portion is provided a lens 6 and a shutter unit 7, which are arranged in the inner lens barrel 10.

The inner lens barrel 10 is relatively reciprocated to move from a housed state (or a stationary state) to an outer side O (as indicated by dotted lines) or to return to the housed state by a zooming operation.

In short, the lens barrels 10 and 20 are in the housed state when the compact camera is not used, and the housed state generally takes a long time.

This zoom lens portion is provided with a light shielding device 1 in the clearance between the nonmagnetic lens barrels 10 and 20. The light shielding device 1 prevents light and dust from invading when the zoom lens portion comes in and goes out for a zooming operation or the like. Here, the light shielding device 1 is likewise used in the clearance between the lens barrel 10 and the camera body or the like.

The light shielding device 1 is provided with: a pair of annular magnets 2 and 3 (or magnetic force generating means) arranged on the inner circumference of the lens barrel 20 and magnetized radially reversely of each other; a magnetic fluid 4 held on the inner circumference end portions of the paired annular magnets 2 and 3; and a seal member 5 arranged on the inner circumference of the lens barrel 20 on the outer side O of the paired annular magnets 2 and 3.

Here, the paired annular magnets 2 and 3 construct magnetic circuit forming means.

The paired annular magnets 2 and 3 are so jointed at their confronting axially end faces that they are magnetized radially reversely of each other. Moreover, the magnetic fluid 4 is magnetically held on the inner circumference end portions of the paired annular magnets 2 and 3 in accordance with the magnetic field distribution between the annular magnets 2 and 3.

Moreover, the paired annular magnets 2 and 3 are exemplified by a permanent magnet, which is made of a metal, an organic material filled with magnet powder, or the like.

On the other hand, the magnetic fluid 4 is exemplified by dispersing fine particles of $Fe_3O_4$ or the like in a colloidal state in oil, water, an organic solvent or the like.

The magnetic fluid 4 is held at its surface on the inner circumference end portions generally along the isomagnetic lines of the spatial magnetic field generated by the paired annular magnets 2 and 3.

Here, as shown by solid lines in FIG. 1, a groove 11 for spacing the outer circumference of the lens barrel 10 from the magnetic fluid 4 is formed at that confronting position of the outer circumference of the lens barrel 10, which confronts the magnetic fluid 4 held on the inner circumference end portions of the paired annular magnets 2 and 3 in the housed state where the inner lens barrel 10 is housed in the lens barrel 20 without the zooming operation or the like.

Here in the embodiment, on the outer circumference of the lens barrel 10, the region on the righthand side of the groove 11 is a region 12 to be contacted by the magnetic fluid 4, and the region on the lefthand side of the groove 11 is a region 13 to be contacted by the seal member 5. The region 13 is disposed closer to the inner circumference of the lens barrel 20 than the region 12. Moreover, the region 13 is an outer side region, and the region 12 is an inner side region.

On the outer circumference of the lens barrel 10, moreover, the edge 11a of the groove 11 for joining the groove 11 and the region 12 contacted by the magnetic fluid 4 is chamfered to have a curvature R.

The seal member 5 is adhered to the inner circumference of the lens barrel 20 on the outer side O of the paired annular magnets 2 and 3, and is formed of a material such as nonwoven fabric, felt or the like.

Moreover, the seal member 5 contacts the region 13 of the outer circumference of the lens barrel 10, when in the housed state, to optically shield and seal the clearance between the lens barrels 10 and 20.

When the lens barrel 10 is moved so far in the moved state for the zooming operation or the like that the seal member 5 takes its confronting position at the region 12, the inner circumference leading end of the seal member 5 fails to reach the region 12. This is because the region 12 is spaced more from the inner circumference of the lens barrel 20 than the region 13. Therefore, the seal member 5 is spaced out of contact with the region 12 as well as the groove 11 thereby to open the clearance between the lens barrels 10 and 20.

On the outer circumference of the lens barrel 10, moreover, there is formed a fluorochemical surface modification film as a wetting-preventing treatment for reducing the wettability with the magnetic fluid 4. Therefore, it is possible to prevent the magnetic fluid 4 from sticking to and residing on the outer circumference of the lens barrel 10 in accordance with the zooming operation or the like thereby to improve the holdability of the magnetic fluid 4. The fluorochemical surface modification film may be formed on at least that region 12 of the outer circumference of the lens barrel 10, which is to be contacted by the magnetic fluid 4.

Here, the wetting-preventing treatment is exemplified not only by forming the film but also by a coating or applying treatment or the like and can also use a wetting-preventing agent other than fluorine.

In the housed state of that light shielding device 1, as indicated by the solid lines in FIG. 1, the magnetic fluid 4 held on the annular magnets 2 and 3 is positioned in the groove 11 and is spaced from the outer circumference of the lens barrel 10. Therefore, it is possible to prevent the deterioration, in which the oil repellency of the fluorochemical surface modification film on the outer circumference of the lens barrel 10 might otherwise be degraded in the housed state at the confronting position to the magnetic fluid 4.

Therefore, the deterioration of the fluorochemical surface modification film on the outer circumference of the lens barrel 10 does not proceed earlier at a local region, so that the premature wetting of the outer circumference of the lens barrel 10 with the magnetic fluid 4 can be prevented to elongate the lifetime of the light shielding device 1.

In this housed state, moreover, the sealing by the magnetic fluid 4 is not done. However, the seal member 5 contacts the surface region 13 of the outer circumference of the lens barrel 10 thereby to seal the clearance between the lens barrels 10 and 20 so that the light shielding device 1 can keep the satisfactory optical shielding and sealing properties.

When the lens barrel 10 is moved for the zooming operation or the like from the housed state to the outer side O, moreover, the magnetic fluid 4 held on the annular magnets 2 and 3 is confronted by the groove 11 and then by the region 12 and then contacts the region 12 so that it clogs the clearance between the lens barrels 10 and 20 thereby to optically shield and seal the clearance.

At the time of this movement, that is, when the position to confront the magnetic fluid 4 moves from the groove 11 to the region 12, the magnetic fluid 4 passes the edge 11a of the groove 11. However, this edge is chamfered, as indicated by R, thereby to prevent the magnetic fluid 4, which might otherwise be caught by and left on the edge 11a of the groove 11, from being reduced in amount. Therefore, the magnetic fluid 4 can be held for a long term thereby to elongate the lifetime of the light shielding device 1.

In the moved state of the lens barrel 10 for the zooming operation or the like, moreover, the magnetic fluid 4 contacts the outer circumference (or the region 12) of the lens barrel 10, but the seal member 5 leaves the outer circumference of the lens barrel 10. Therefore, a high sliding resistance is not caused by the contact of the seal member 5, but a little sliding resistance is present due to the contact of the magnetic fluid 4. Therefore, it is possible to reduce the driving force which is required for moving the lens barrel 10.

As a result, the feed of a low driving force is sufficient after the seal member 5 left the outer circumference of the lens barrel 10. Therefore, it is possible to lower the power consumption of the drive device for zooming the zoom lens portion of the compact camera or for another operation.

Moreover, the construction for spacing the seal member 5 from the outer circumference of the lens barrel 10 in the moved state of the lens barrel 10 for the zooming operation or the like is simply realized by spacing the region 12 of the outer circumference of the lens barrel 10 on the inner side I at a more distance from the inner circumference of the lens barrel 20 than the region 13 on the outer side O thereby to keep the inner circumference end portion of the seal member 5 out of contact with the region 12 on the inner side I. Therefore, the seal member 5 can open the clearance between the lens barrels 10 and 20 easily without resorting to any special mechanism for spacing the seal member 5 from the outer circumference of the lens barrel 10.

Here, the magnetic circuit forming means of this embodiment is constructed by jointing the paired annular magnets 2 and 3 magnetized reversely, so that the construction is easy and excellent in the manufacturing and assembling properties.

Second Embodiment

Figure 2:
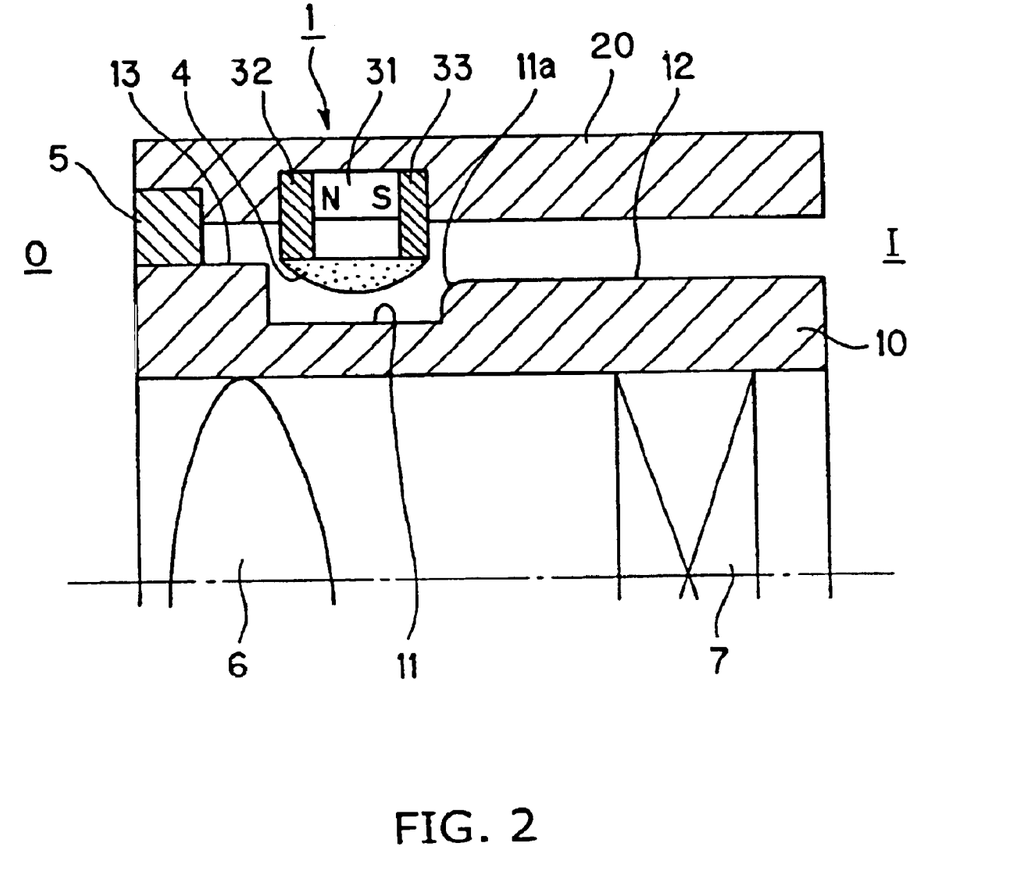
FIG. 2 is a half sectional view showing a light shielding device according to a second embodiment.

FIG. 2 shows a light shielding device according to a second embodiment. The second embodiment is modified by changing the construction of the magnetic circuit forming means. The remaining construction is identical to that of the first embodiment.

The magnetic circuit forming means is constructed of: an annular magnet (or a magnetic force generating means) 31 magnetized axially; and a pair of pole pieces 32 and 33 made of magnetic materials fixed on the two axial ends of the annular magnet.

And, the magnetic fluid 4 is held between the inner circumference end portions of the paired pole pieces 32 and 33.

Thus, the magnetic circuit forming means can have its construction changed according to its application or mounting space.

Third Embodiment

Figure 3:
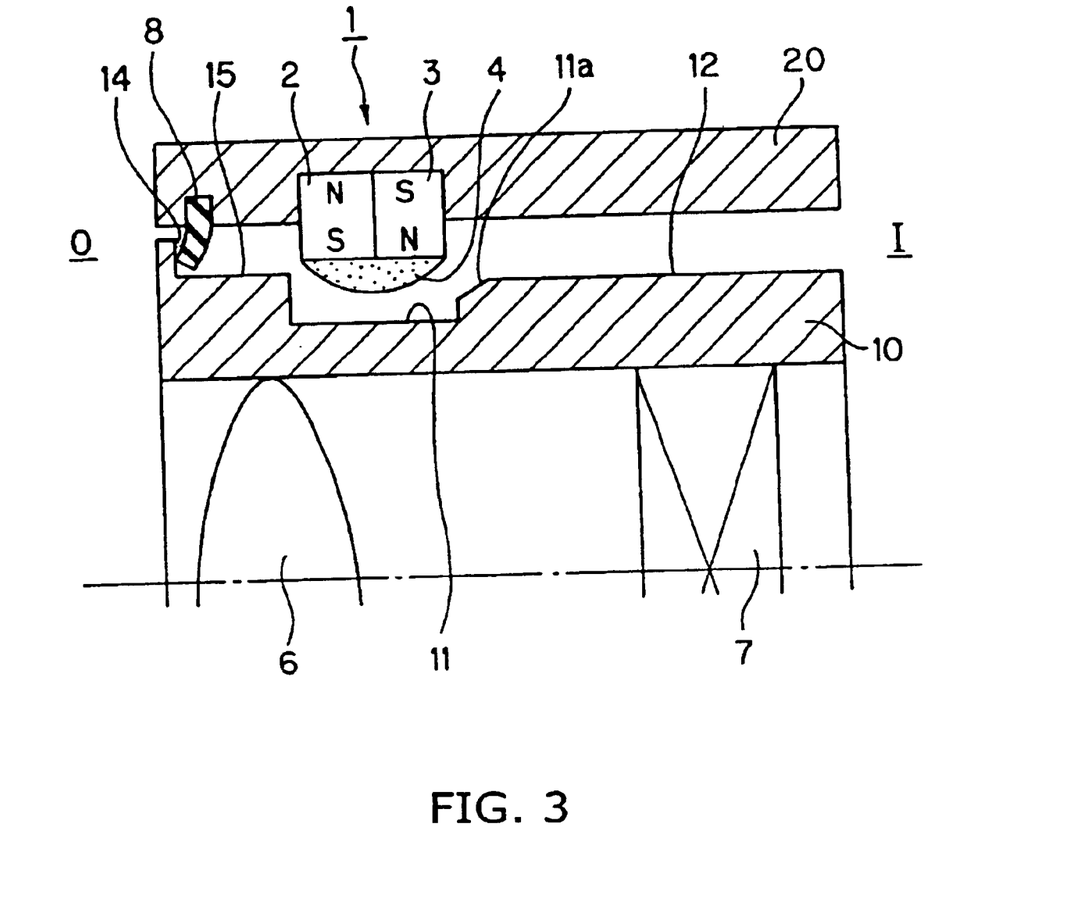
FIG. 3 is a half sectional view showing a light shielding device according to a third embodiment.

FIG. 3 shows a light shielding device according to a third embodiment. Here will be described the characteristic portions of the light shielding device 1 according to the third embodiment, but the remaining construction identical to that of the first embodiment will be omitted by designating it by the common reference numerals.

In the third embodiment, a seal member 8 is mounted in the inner circumference of the lens barrel 20 on the outer side of the paired annular magnets 2 and 3. The seal member 8 is formed of an elastic material of rubber or the like into a ring shape, in which the inner circumference leading end is bent to the outer side O. Moreover, the inner circumference leading end of the seal member 8 is short of the surface (or region 15) of the outer circumference of the lens barrel 10. The remaining actions of the seal member 8 are similar to those of the seal member 5 of the first embodiment.

In the housed state, moreover, the seal member 8 optically shields and seals the clearance between the lens barrels 10 and 20 by causing the inner circumference leading end bent to the outer side O to contact a vertical section 14, which is formed on the outer circumference of the lens barrel 10 and directed to the inner side I.

Moreover, the seal member 8 is spaced at its inner circumference leading end from the surface (or region 15) of the outer circumference of the lens barrel 10 so that it does not contact the outer circumference of the lens barrel 10 even just after the start and before the end of the movement for the zooming operation or the like. Therefore, the high sliding resistance, as might otherwise be caused by the contact of the seal member 8, can be eliminated to lower the driving force necessary for moving the lens barrel 10. Moreover, a constant driving force is sufficient for driving the lens barrel 10.

On the outer circumference of the lens barrel 10, moreover, the edge 11a of the groove 11 joining the groove 11 and the region 12 to be contacted by the magnetic fluid 4 is chamfered in a taper shape. Thus, it is also possible to change the chamfered shape of the edge 11a of the groove 11.

On the other hand, the inner circumference leading end of the seal member 8 is bent to the outer side O and is elastically deformed and press-fitted on the vertical section 14 of the lens barrel 10. For the time period after the lens barrel 10 starts the movement and before the magnetic fluid 4 comes into the sealed state, therefore, the seal member 8 keeps its contacting state with the vertical section 14 while restoring and deforming elastically, so that it can retain the sealing properties at all times.

Here in this embodiment, the inner circumference leading end of the seal member 8 is spaced from the outer circumference of the lens barrel 10. However, the construction can also be modified such that the inner circumference leading end of the seal member 8 contacts the surface (or the region 15) of the outer circumference of the lens barrel 10.

Fourth Embodiment

Figure 4:
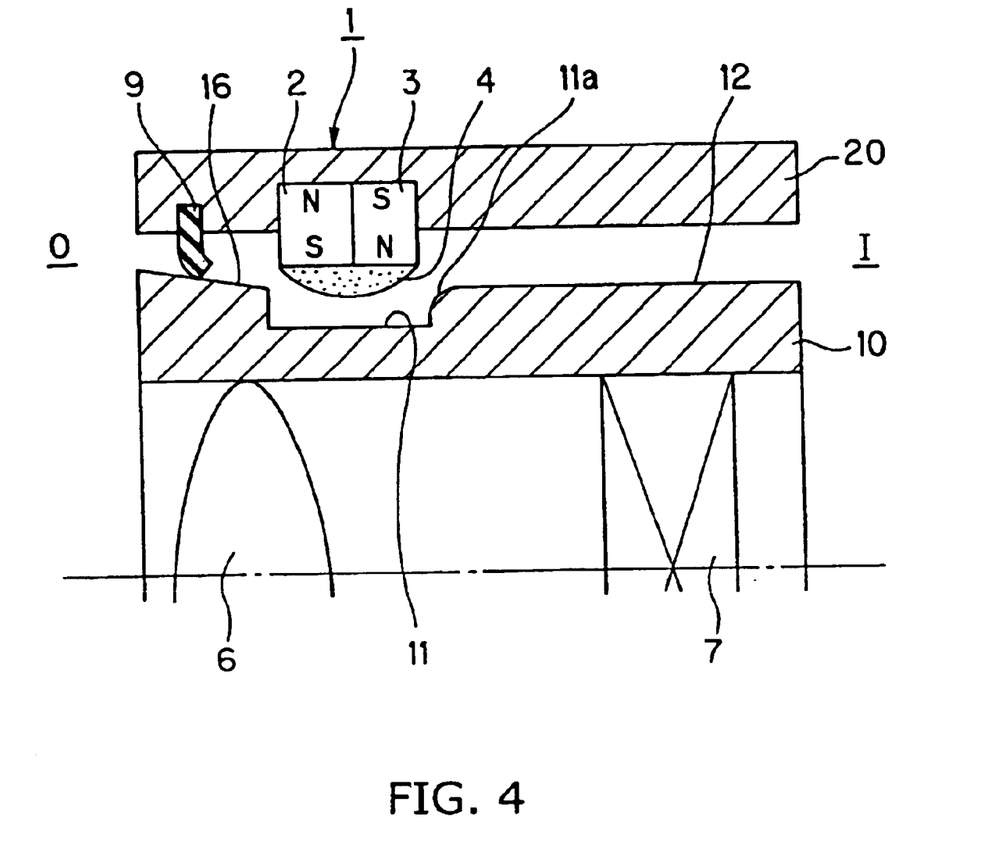
FIG. 4 is a half sectional view showing a light shielding device according to a fourth embodiment.

FIG. 4 shows a light shielding device according to a fourth embodiment. Here will be described the characteristic portions of the light shielding device 1 according to the fourth embodiment, but the remaining construction identical to that of the first embodiment will be omitted by designating it by the common reference numerals.

In the fourth embodiment, a seal member 9 is mounted in the inner circumference of the lens barrel 20 on the outer side O of the paired annular magnets 2 and 3 and is formed of an elastic material of rubber or the like into a ring shape. The remaining actions of the seal member 9 are similar to those of the seal member 5 of the first embodiment.

Moreover, that surface of the outer circumference of the lens barrel 10, which is to be contacted by the seal member in the housed state and just after the start and before the end of the movement for the zooming operation or the like, is formed into such a taper slope 16 that the outer side of the surface approaches the inner circumference of the lens barrel 20.

As the housed state is being approached the nearer, therefore, the seal member 9 comes into the closer contact with slope 16, as shown, so that the optical shield and seal can be satisfactorily attained in the housed state.

Fifth Embodiment

Figure 5:
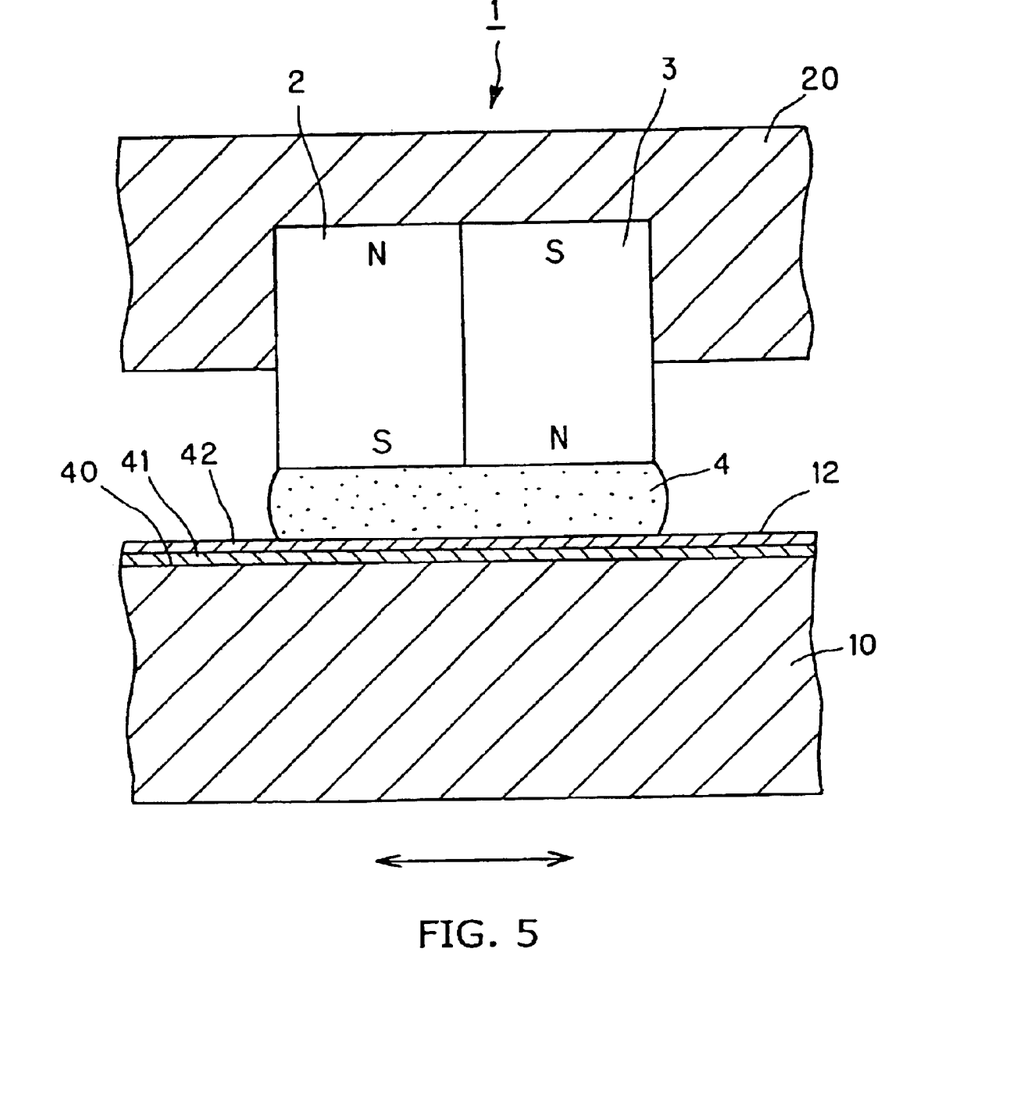
FIG. 5 is a partly sectional view showing a light shielding device according to a fifth embodiment.

FIG. 5 schematically shows an essential portion of a light shielding device according to a fifth embodiment. Here will be described one embodiment of the surface treatment of the lens barrel 10. The remaining construction identical to those of the aforementioned embodiments will be omitted by designating it by the common reference numerals.

Of the lens barrels 10 and 20 or the two members reciprocating relative to each other, the outer circumference of the lens barrel 10 or the member on the side for the sliding contact of the magnetic fluid 4 is subjected to a wetting-preventing treatment for lowering the wetting properties with the magnetic fluid 4.

In this embodiment, the sliding contact face of the lens barrel 10 is subjected to the oil-repelling treatment by preparing an organic thin film 41 on the surface 40 of the lens barrel 10 and then by coating the surface of that organic thin film 41 with a surface treating agent having oil-repelling properties to form an oil-repelling coating film 42.

The material for the organic thin film 41 is generally exemplified by high polymers such as rubber, the PVA (polyvinyl alcohol) to be used as a binder in the preparation of resin materials or the like. In addition to the polyvinyl alcohol, moreover, there can also be used high polymers such as ethylene-vinyl acetate copolymer, polyvinyl acetate, poly arylamine, polyvinyl ether or ethylene-vinyl alcohol copolymer, or their mixture or copolymer. As a result, it is possible to attain a sufficient adhesion between the surface 40 of the lens barrel 10 and the oil-repelling coating film 42.

When the organic thin film 41 is to be prepared, the aforementioned high polymer material is dissolved at first in a concentration of 0.5 wt. % to 10.0 wt. % in such a solvent, e.g., water, hexane, toluene or ethyl acetate that the high polymer material can be dissolved.

This high polymer solution is applied to the surface 40 of the lens barrel 10 by the existing method such as the dipping method, the spraying method or the brushing method. In the dipping method, for example, the application is performed by dipping the lens barrel 10 in the high polymer solution and then by pulling up the same at a constant speed of 0.1 mm/s to 2.0 mm/s.

After the application, the organic thin film 41 is obtained by drying and removing the solvent. The thickness of the organic thin film 41 is desirably 0.2 micron to 1.0 micron. This can be adjusted by the solution concentration, the pulling-up speed, the size of droplets of the spray, the spraying time period or the like.

A surface treating agent is applied to the surface of that organic thin film 41 to form the oil-repelling coating film. Here, the surface treating agent is exemplified by a coupling agent containing fluorine or a monomer containing a fluorine chain for easy polymerization, but a commercially available oil-repelling agent can also be used. As a result, it is easy to form the oil-repelling coating film having a solvent resistance and a thermal stability.

As the method for applying the surface treating agent, there can be used a method similar to that for applying the high polymer solution at the time of the aforementioned organic thin film preparation. Moreover, the film thickness is so adjusted by the solution concentration, the pulling-up speed, the size of the droplets of the spray and the spraying time period so as to be 0.1 microns to 2.0 microns after the subsequent heating operation.

After the application, the surface treating agent is highly polymerized by heating it to form the oil-repelling coating film 42. The heating conditions may be exemplified by 120° C. to 200° C. and about 0.5 hrs. to 2 hrs. The optimum heating conditions may be more preferably determined to set the temperature equal to or lower than the heat resisting value of the material of the lens barrel 10 and the organic thin film 41 and to maximize the adhesion strength of the oil-repelling coating film 42 to the organic thin film 41.

Here, the material for the member to form the oil-repelling coating film is generally exemplified by a metal such as a ferromagnetic material but can also be exemplified by a metal of a non-ferromagnetic material or a resin. This is because the surface treating agent contains the fluorine chain and has a low surface tension so that it exhibits a wettability on the surface of any material and can prepare the coating film on its surface. Therefore, the coating film can be easily prepared on the outer circumference of the members of not only the metal but also various materials.

By thus subjecting the outer circumference surface 40 of the lens barrel 10 for the magnetic fluid 4 to come into sliding contact with, to the oil repelling treatment (or the wetting-preventing treatment), the magnetic fluid 4 can be prevented by the oil repellency of the sliding contact face of the lens barrel 10 from sticking to and residing on the sliding contact face ever when the lens barrel 10 is reciprocated. Therefore, it is possible to prevent the reduction in the magnetic fluid amount and the deterioration of the sealing properties.

Moreover, the organic thin film 41 is interposed between the surface 40 of the lens barrel 10 and the oil-repelling coating film 42 so that the adhesion strength between the surface 40 of the lens barrel 10 and the oil-repelling coating film 42 can be enhanced to prevent the separation or the partial elimination of the oil-repelling coating film 42 thereby to continue the oil-repelling effect (or the wetting-preventing effect) of the sliding contact face of the lens barrel 10 for a longer term.

Sixth Embodiment

Figure 6:
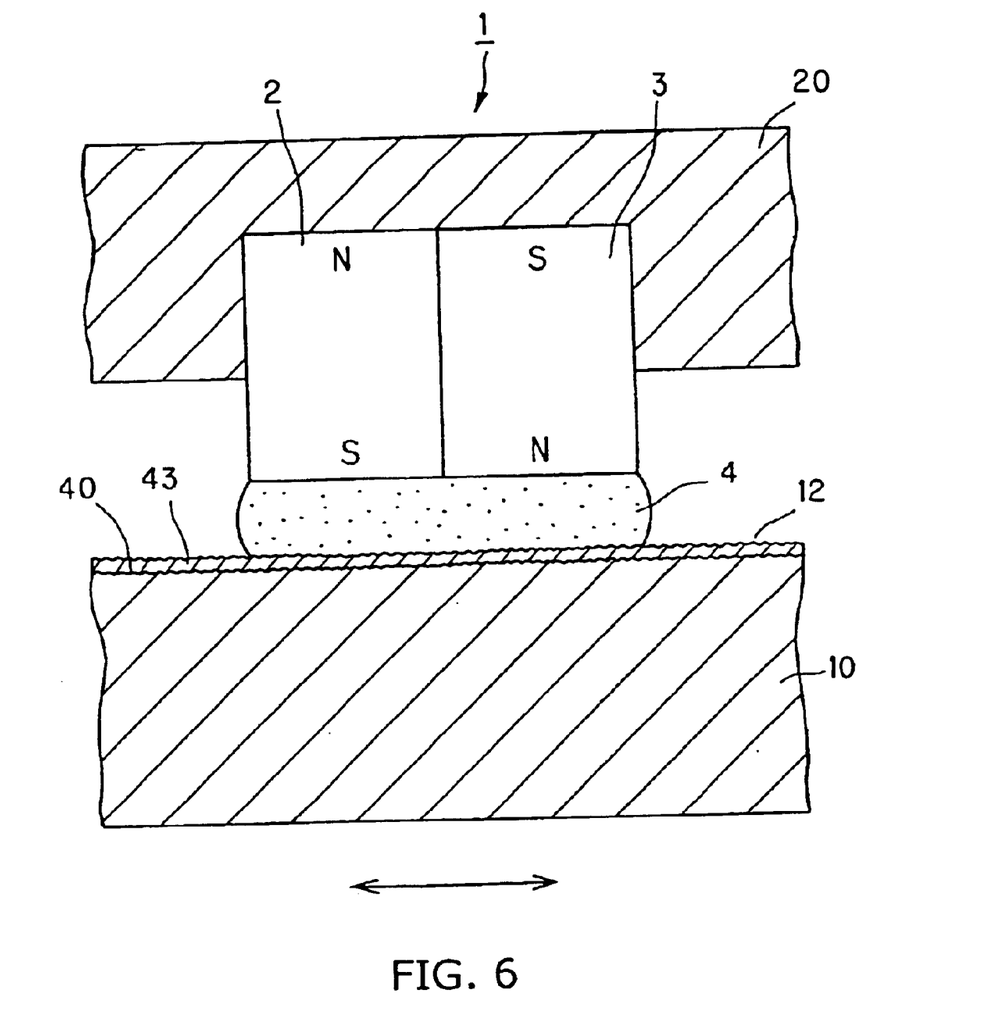
FIG. 6 is a partly sectional view showing a light shielding device according to a sixth embodiment.

FIG. 6 schematically shows an essential portion of a light shielding device according to a sixth embodiment. Here will be described one embodiment of the surface treatment of the lens barrel 10. The remaining construction is identical to those of the aforementioned embodiments so that its description will be omitted by designating it by the common reference numerals.

Depending upon the application of the magnetic fluid sealing device, as has been described hereinbefore, there is demanded a quick response of the magnetic fluid to the high-speed relative reciprocations of the two members. The quick response is also demanded for the zoom lens portion of the compact camera. With only the coating film of the fluorochemical surface modification agent, however, the improvement in the quick response is so difficult as to leave a problem that the sealing properties by the magnetic fluid cannot be retained.

Therefore, we have made keen investigations to find out the following fact. Specifically, the quick response of the magnetic fluid is drastically improved by giving an extremely large specific surface area to the coating film surface, that is, by making the surface highly rough.

In this embodiment, the surface 40 of the lens barrel 10 is subjected to a surface roughness increasing treatment before an oil-repelling coating film 43 is formed on the surface 40 of the lens barrel 10. Specifically, the surface 40 of the lens barrel 10 is worked by an electrolytic etching or shot blasting method.

The electrolytic etching method is one utilizing the so-called "phenomenon reverse to the electric plating". Specifically, the electric plating is deposition of a metal on the member surface from the electrolyte, whereas the electrolytic etching is dissolution of a metal into the electrolyte from the member surface. Therefore, the extent of surface roughness can be controlled by the electric current at the electrolytic etching time and by the kind and concentration of the electrolyte.

On the other hand, the shot blasting method increases the surface roughness by blasting particles of a small diameter to the member surface.

The surface treating agent is applied to the surface 40, the roughness of which is increased by either of the aforementioned methods, to form the oil-repelling coating film. The material of and the method for forming the surface treating agent may be exemplified by those similar to those of the aforementioned fifth embodiment.

At this time, the oil-repelling coating film 43 is formed to have a substantially equal film thickness so that its surface state reflects the roughness of the surface 40 of the lens barrel 10. As a result, the oil-repelling coating film 43 has a high surface roughness.

Therefore, the quick response of the magnetic fluid 4 is raised so that the stable sealing property can be kept even in case the reciprocating speed of the lens barrel 10 is high.

Seventh Embodiment

Figure 7:
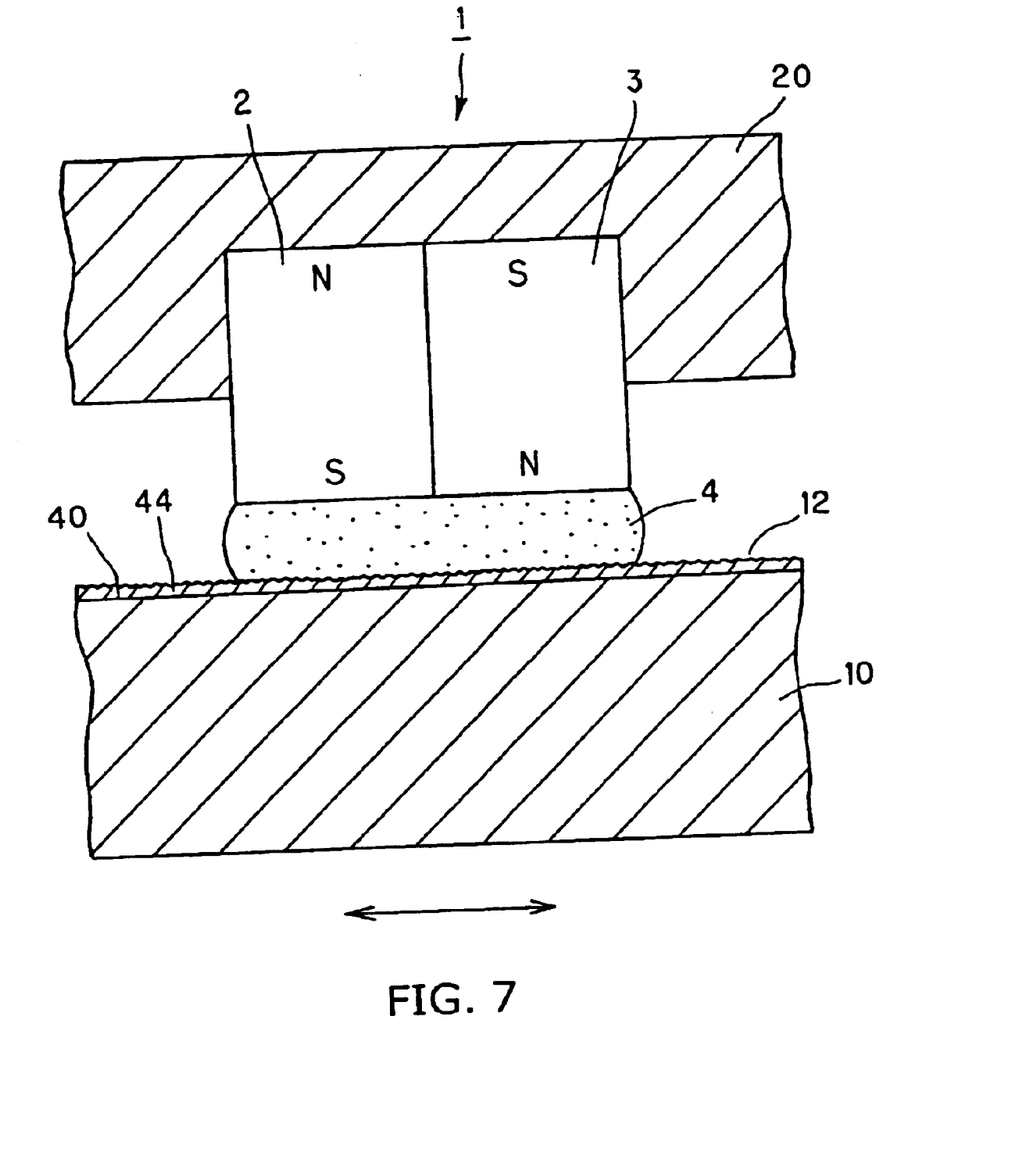
FIG. 7 is a partly sectional view showing a light shielding device according to a seventh embodiment.

FIG. 7 schematically shows an essential portion of a light shielding device according to a seventh embodiment. Here will be described one embodiment of the surface treatment of the lens barrel 10. The remaining construction is identical to those of the aforementioned embodiments so that its description will be omitted by designating it by the common reference numerals.

In the aforementioned sixth embodiment, there has been disclosed the method for subjecting the surface 40 of the lens barrel 10 in advance to the surface roughness increasing treatment. However, the working method by the electrolytic etching or shot blasting method cannot be applied to the surface treatment of any material.

First of all, the material, which can be subjected to the surface treatment by the electrolytic etching method, is limited to that having an electrically conducting property, i.e., an electric conductivity such as that of a metal. It is considered that the material such as a resin material having no electric conductivity is electrolessly plated in advance before the electrolytic etching method thereby to form a layer of a substance having the electric conductivity. However, the preparing step is not preferred because it is complicated to raise the cost.

On the other hand, the surface treatment by the shot blasting method is effective for a material having a high hardness such as a metal or ceramics but is defective in that it cannot be applied to a material having a low hardness such as a resin material or a coated surface.

The method to be proposed in this embodiment makes such a treatment unnecessary as increases the roughness of the member surface (or the surface 40 of the lens barrel 10), and can be applied to a member of any material. The method will be specifically described in the following.

Of the lens barrels 10 and 20 or the two relatively reciprocating members, the lens barrel 10 or the member on the side, with which the magnetic fluid 4 is to come into sliding-contact, is subjected at its outer circumference to the wetting-preventing treatment for lowering the wettability with the magnetic fluid 4.

In this embodiment, the surface 40 of the lens barrel 10 is coated with the surface treating agent, in which fine particles of silica ($SiO_2$), PTFE (polytetrafluoroethylene) or the like are mixed and dispersed, thereby to form an oil-repelling coating film 44. At this time, the fine particles are characterized in that they are two-dimensionally arrayed over the surface 40 of the lens barrel 10 under the conditions of specified particle diameter, concentration and dispersion. Therefore, the oil-repelling coating film 44 is formed over the two-dimensionally arrayed fine particles so that it has a large specific surface area (or a high surface roughness). As a result, it is possible to obtain the target quick response.

The surface treating agent is exemplified by a coupling agent containing fluorine or a monomer containing an easily polymerizable fluorine chain, but can also be exemplified by another commercially available oil-repelling agent. As a result, it is possible to easily form the oil-repelling coating film having a solvent resistance and a thermal stability.

Moreover, the fine particles to be used and mixed in the surface treating agent have an average particle diameter of 0.1 microns to 100 microns, or preferably 0.5 microns to 50 microns.

Moreover, the materials for the fine particles can be any, if they can be dispersed in the surface treating agent.

Here, the term "dispersion" is used to mean that the fine particles do not take a structure, in which they are firmly aggregated, when they are mixed with the surface treating agent, namely, that the fine particles have weak interactions.

In the presence of the firmly aggregated structure, it is impossible to obtain the two-dimensional array of the fine particles. Therefore, the material for the fine particles may be exemplified by silica ($SiO_2$) or PTFE (polytetrafluoroethylene), in which the fine particles have such weak interactions that they can easily take the two-dimensional array structure.

Moreover, the fine particles are given, when mixed, a weight concentration of 0.5% to 5.0% with respect to the surface treating agent. However, the optimum fine particle concentration is difficult to calculate strictly, because it is influenced by the particle diameter and diameter distribution of the fine particles and by the adhesion of the fine particles to the surface 40. It is, therefore, advisable to examine the proper fine particle concentration experimentally in advance.

Now, the surface treating agent containing the fine particles thus obtained is applied to the surface 40 of the lens barrel 10 by a method similar to those of the aforementioned embodiments.

After applied, the surface treating agent is polymerized by heating it thereby to form the oil-repelling coating film 44. The heating conditions may be exemplified by 120° C. to 200° C. and about 0.5 hrs. to 2 hrs. More preferably, the optimum heating conditions are so determined to the heat resisting temperature or lower of the material of the lens barrel 10 that the adhesion strength of the oil-repelling coating film 44 to the surface 40 of the lens barrel 10 may be maximized.

The fine particles in the surface treating agent take the two-dimensional array structure over the surface 40 of the lens barrel 10, as has been described hereinbefore, at the application time. When the oil-repelling coating film 44 is to be formed by the heating treatment, too, the two-dimensional array structure of the fine particles can be retained to form a coating film having a large specific surface area.

Here, the material for the member to form the oil-repelling coating film is exemplified generally by a metal such as a ferromagnetic material but can also be exemplified by a non-ferromagnetic metal or a resin. This is because the surface treating agent contains the fluorine chain and has a low surface tension so that it exhibits a wetting property on the surface of any material and can prepare the coating film on its surface. Therefore, the coating film can be easily prepared on the outer circumference of the member of not only the metal but also various materials.

Thus, according to this embodiment, the oil-repelling coating film having a high surface roughness can be easily formed on the surface of any material merely by mixing the fine particles into the surface treating agent. By raising the surface roughness of the coating film, moreover, the quick response of the magnetic fluid 4 can be raised to keep the stable sealing property even in case the reciprocating speed of the lens barrel 10 is high.

Comparison

Figure 8:
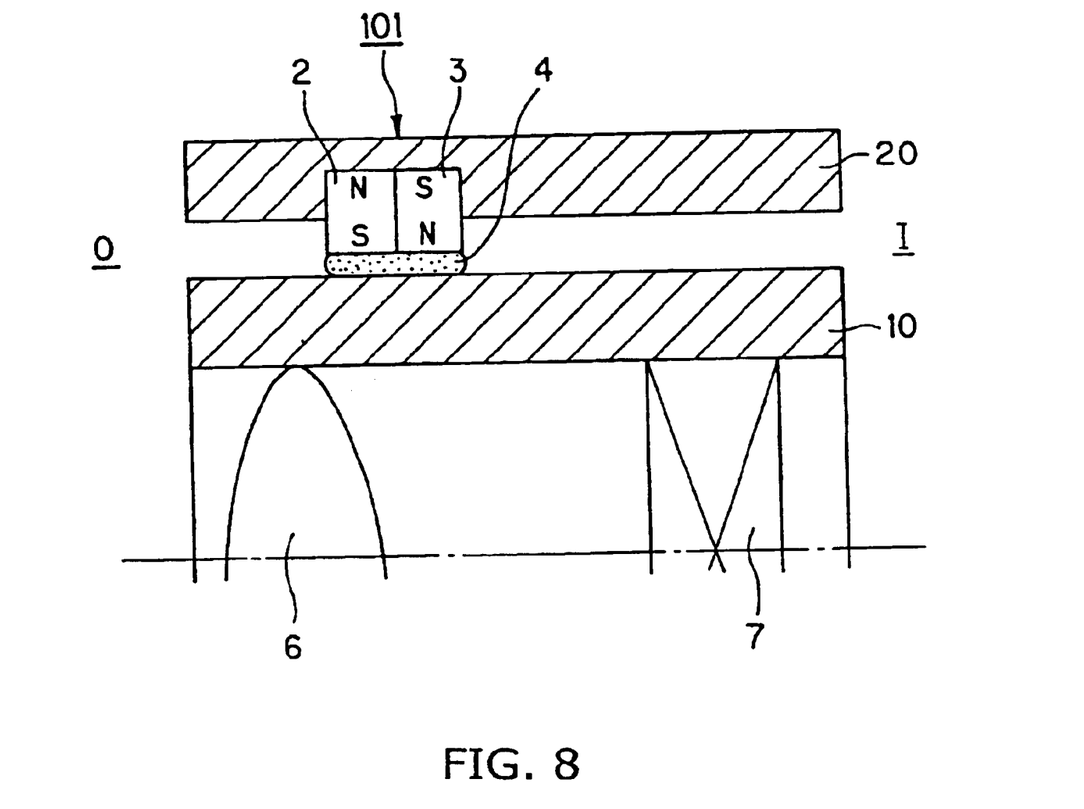
FIG. 8 is a half section showing a magnetic fluid sealing device of the conventional art as a comparison.

With reference to FIG. 8, here will be described the example, in which the magnetic fluid sealing device of the conventional art is applied to a light shielding device 101 similar to those of the aforementioned embodiments.

The light shielding device 101 of this comparison is provided with the paired annular magnets 2 and 3 arranged in the inner circumference of the lens barrel 20, and the magnetic fluid 4 held on the inner circumference end portions of the paired annular magnets 2 and 3. Moreover, the magnetic fluid 4 contacts the outer circumference of the lens barrel 10 at all times.

In the housed state for an elongated time period, therefore, that fluorochemical surface modification film of the outer circumference of the lens barrel 10, which contacts the magnetic fluid 4 in the housed state, lowers its oil repellency so that the deterioration of the fluorochemical surface modification film at that portion decides the lifetime of the light shielding device 101.

In this respect, according to the constructions of the aforementioned individual embodiments, the magnetic fluid 4 and the outer circumference of the lens barrel 10 keep the non-contact state in the housed state. Therefore, no deterioration of the fluorochemical surface modification film occurs so that the lifetime of the light shielding device 1 can be elongated.

INDUSTRIAL APPLICABILITY

As has been described, the invention comprises: a groove for spacing the surface of the other member from the magnetic fluid when the two members are at a specified stop position; and a seal member for sealing the clearance when the two members are at the specified stop position. In the stopped state of the two members, the magnetic fluid is positioned in the groove and spaced from the surface of the other member. At the position confronting the magnetic fluid at the stopped time of the two members, therefore, the surface treatment of the other member can be prevented from being deteriorated, but the deterioration of the surface treatment of the surface of the other member does not proceed earlier in a local region so that the lifetime of the device can be elongated.

In the stopped state of the two members, moreover, the seal member seals the clearance between the two members so that the device can keep the satisfactory sealing property.

The edge of the groove for joining the groove and that region of the surface of the other member, which is to be contacted by the magnetic fluid, is chamfered. Therefore, the magnetic fluid can move smoothly from the groove to the region to be contacted by the magnetic fluid, so that the magnetic fluid, which might otherwise be caught by and left on the edge of the groove, can be prevented from being reduced in amount. The magnetic fluid can be held for a long term thereby to elongate the lifetime of the device.

The seal member opens the clearance at the relative reciprocations of the two members. At the time of relative reciprocations of the two members, the sliding resistance, as might otherwise be caused by the seal member for sealing the clearance, can be eliminated to lower the driving force necessary for the relative reciprocations of the two members.

The seal member seals the clearance till the magnetic fluid comes into contact with the surface of the other member. Even when the two members shift from the stopped state to the relatively reciprocating state, the clearance is reliably sealed at all times.

The surface of the other member includes: an outer side region to be contacted by the seal member when the two members take the specified stop position; and an inner side region to be contacted by the magnetic fluid at the time of relative reciprocations of the two members, and the inner side region is so positioned at a larger distance than the outer side region from the one member that the seal member may be spaced from the surface of the other member at the time of relative reciprocations of the two members. At the relatively reciprocating time of the two members, therefore, the seal member can open the clearance easily with the driving force applied to the relative reciprocations of the two members.

The surface of the other member is subjected to a wetting-preventing treatment for lowering the wettability with the magnetic fluid. The deterioration of the wetting-preventing treatment of the surface of the other member can be prevented at the position confronting the magnetic fluid at the stopped time of the two members, and the deterioration of the wetting-preventing treatment of the surface of the other member does not proceed earlier in a local region, so that the premature wetting of the surface of the other member with the magnetic fluid can be prevented to elongate the lifetime of the device.

The surface of the other member is coated with a surface treating agent having an oil-repelling property, and it is possible to lower the wettability easily with the magnetic fluid.

By interposing the organic thin film between the member surface and the oil-repelling coating film (or the coating film of the surface treating agent), the adhesion strength between the member surface and the oil-repelling coating film can be enhanced to prevent the separation or the partial elimination of the oil-repelling coating film thereby to continue the oil-repelling effect (or the wetting-preventing effect) of the member surface for a longer term.

The organic thin film contains polyvinyl alcohol, ethylene-vinyl acetate copolymer, polyvinyl acetate, poly arylamine, polyvinyl ether or ethylene-vinyl alcohol copolymer, or their mixture or copolymer. The sufficient adhesion strength between the member surface and the oil-repelling coating film can be acquired to prevent the separation or the partial elimination of the oil-repelling coating film reliably.

The surface treating agent used contains a coupling agent containing fluorine, a monomer containing a fluorine chain, or an oil-repelling agent, and it is possible to form the oil-repelling coating film which is excellent in a solvent resistance and a thermal stability.

The surface of the other member is subjected to a surface roughness increasing treatment so that the surface roughness of the oil-repelling coating film formed on the member surface is increased. By increasing the surface roughness of the coating film surface, moreover, the quick response of the magnetic fluid is raised. Even in case the reciprocating speeds of the two members are high, therefore, the stable sealing property can be kept.

The surface treating agent is mixed with fine particles, and the fine particles in the surface treating agent are dispersed to take a two-dimensional array structure. This two-dimensional array structure is retained even after the coating film was formed, so that a coating film having a high surface roughness can be easily prepared. By raising the surface roughness of the coating film surface, the quick response of the magnetic fluid is raised so that the stable sealing property can be kept even in case the reciprocating speed of the two members is high. Moreover, the member surface need not be subjected in advance to the surface roughness increasing treatment. Therefore, it is possible to facilitate the manufacture and to reduce the cost.

The fine particles used are fine particles of silica or polytetrafluoroethylene. The fine particles of these materials have such weak interactions between them that they can easily take the two-dimensional array structure when mixed with the surface treating agent.

What is claimed is:

1. A magnetic fluid sealing device for sealing the clearance of two members assembled to reciprocate relative to each other, comprising:

a magnetic fluid held magnetically on one of said two members and contacting the surface of the other member for sealing said clearance;

a groove formed in the surface of said other member for spacing the surface of said other member from said magnetic fluid when said two members are at a specified stop position; and a seal member for sealing said clearance when said two members are at said specified stop position.

2. A magnetic fluid sealing device according to claim 1, wherein the edge of said groove for joining said groove and that region of the surface of said other member, which is to be contacted by said magnetic fluid, is chamfered.

3. A magnetic fluid sealing device according to claim 1, wherein said seal member opens said clearance at the relative reciprocations of said two member.

4. A magnetic fluid sealing device according to claim 1, wherein said seal member seals said clearance till said magnetic fluid comes into contact with the surface of said other member.

5. A magnetic fluid sealing device according to claim 3, wherein:

the surface of said other member includes: an outer side region to be contacted by said seal member when said two members take said specified stop position; and an inner said region to be contacted by said magnetic fluid at the time of relative reciprocations of said two members; and said inner side region is so positioned at a larger distance than said outer side region from said one member that said seal member may be spaced from the surface of said other member at the time of relative reciprocations of said two members.

6. A magnetic fluid sealing device according to claim 1, wherein the surface of said other member is subjected to a wetting-preventing treatment for lowering the wettability with said magnetic fluid.

7. A magnetic fluid sealing device according to claim 6, wherein the surface of said other member is coated with a surface treating agent having an oil-repelling property.

8. A magnetic fluid sealing device according to claim 6, wherein the surface of said other member is prepared thereon with an organic thin film and is then coated on said organic thin film surface with a surface treating agent having an oil-repelling property.

9. A magnetic fluid sealing device according to claim 8, wherein said organic thin film contains polyvinyl alcohol, ethylene-vinyl acetate copolymer, polyvinyl acetate, poly arylamine, polyvinyl ether or ethylene-vinyl alcohol copolymer, or their mixture or copolymer.

10. A magnetic fluid sealing device according to claim 7, wherein said surface treating agent contains a coupling agent containing fluorine, a monomer containing a fluorine chain, or an oil-repelling agent.

11. A magnetic fluid sealing device according to claim 7, wherein the surface of said other member is subjected to a surface roughness increasing treatment.

12. A magnetic fluid sealing device according to claim 7, wherein said surface treating agent is mixed with fine particles.

13. A magnetic fluid sealing device according to claim 12, wherein said fine particles are fine particles of silica or polytetrafluoroethylene.

* * * * *